United States Patent
Ting et al.

(10) Patent No.: US 7,849,512 B2
(45) Date of Patent: *Dec. 7, 2010

(54) METHOD AND SYSTEM TO CREATE SECURE VIRTUAL PROJECT ROOM

(75) Inventors: Annsheng Chien Ting, Los Altos Hills, CA (US); Tipin Chang, Cupertino, CA (US)

(73) Assignee: Fortressware, Inc., Los Altos, CA (US)

( * ) Notice: Subject to any disclaimer, the term of this patent is extended or adjusted under 35 U.S.C. 154(b) by 989 days.

This patent is subject to a terminal disclaimer.

(21) Appl. No.: 11/385,293

(22) Filed: Mar. 20, 2006

(65) Prior Publication Data

US 2006/0212714 A1 Sep. 21, 2006

Related U.S. Application Data

(60) Provisional application No. 60/663,584, filed on Mar. 21, 2005.

(51) Int. Cl.
*G06F 17/30* (2006.01)
(52) U.S. Cl. .................................. 726/27; 713/155
(58) Field of Classification Search ................ 726/1–2, 726/4, 8–9, 17, 20, 27–29, 32, 35; 713/155, 713/170, 182; 717/101–108, 120–122
See application file for complete search history.

(56) References Cited

U.S. PATENT DOCUMENTS

| | | | | |
|---|---|---|---|---|
| 6,161,146 A * | 12/2000 | Kley et al. | .................. | 709/248 |
| 6,209,101 B1 | 3/2001 | Mitchem et al. | | |
| 6,272,631 B1 * | 8/2001 | Thomlinson et al. | ........ | 713/155 |
| 6,591,278 B1 * | 7/2003 | Ernst | ....................... | 707/104.1 |
| 6,760,734 B1 * | 7/2004 | Stephens | ........................... | 1/1 |
| 7,072,940 B1 * | 7/2006 | Day et al. | .................. | 709/204 |
| 7,092,942 B2 * | 8/2006 | Frieden et al. | ................ | 707/9 |
| 7,155,435 B1 * | 12/2006 | Day et al. | ........................... | 1/1 |
| 7,167,844 B1 * | 1/2007 | Leong et al. | .................. | 705/80 |
| 7,395,436 B1 * | 7/2008 | Nemovicher | ................ | 713/193 |
| 7,398,267 B2 * | 7/2008 | Fenton-Jones | ..................... | 1/1 |
| 7,467,373 B2 * | 12/2008 | Pepin et al. | .................... | 717/108 |
| 7,505,482 B2 * | 3/2009 | Adamczyk et al. | .......... | 370/469 |
| 2002/0059054 A1 * | 5/2002 | Bade et al. | ..................... | 703/20 |
| 2003/0009315 A1 * | 1/2003 | Thomas et al. | ................ | 703/1 |
| 2003/0105734 A1 * | 6/2003 | Hitchen et al. | ................. | 707/1 |
| 2003/0187932 A1 | 10/2003 | Kennedy | | |
| 2003/0192038 A1 * | 10/2003 | Hagmann et al. | ........... | 717/170 |

(Continued)

FOREIGN PATENT DOCUMENTS

WO PCT/US2006/010453 3/2006

OTHER PUBLICATIONS

Lorch and Kafura, Supporting secure ad-hoc user collaboration in Grid environments, 2002,M.Parashar (Ed) pp. 181-193.*

*Primary Examiner*—Matthew B Smithers
*Assistant Examiner*—Abu Sholeman
(74) *Attorney, Agent, or Firm*—DLA Piper LLP (US)

(57) ABSTRACT

A method and system for creating secure virtual project rooms is provided. The system creates a security focused development infrastructure to augment existing planning tools, existing development environment, and provide analytics for adjusting the plans to carry out a secure distributed project development.

23 Claims, 9 Drawing Sheets

U.S. PATENT DOCUMENTS

| | | | |
|---|---|---|---|
| 2003/0204751 A1* | 10/2003 | Jindani et al. | 713/201 |
| 2003/0233490 A1* | 12/2003 | Blaser et al. | 709/328 |
| 2004/0054908 A1* | 3/2004 | Circenis et al. | 713/176 |
| 2004/0117358 A1* | 6/2004 | von Kaenel et al. | 707/3 |
| 2004/0181425 A1* | 9/2004 | Schwerin-Wenzel et al. | 705/1 |
| 2005/0044380 A1 | 2/2005 | Bostick et al. | |
| 2005/0066309 A1* | 3/2005 | Creamer et al. | 717/127 |
| 2005/0071275 A1* | 3/2005 | Vainstein et al. | 705/51 |
| 2005/0071664 A1* | 3/2005 | de Jong | 713/200 |
| 2005/0114475 A1* | 5/2005 | Chang et al. | 709/220 |
| 2006/0047957 A1* | 3/2006 | Helms et al. | 713/165 |
| 2006/0101408 A1* | 5/2006 | Kotamarthi et al. | 717/126 |

* cited by examiner

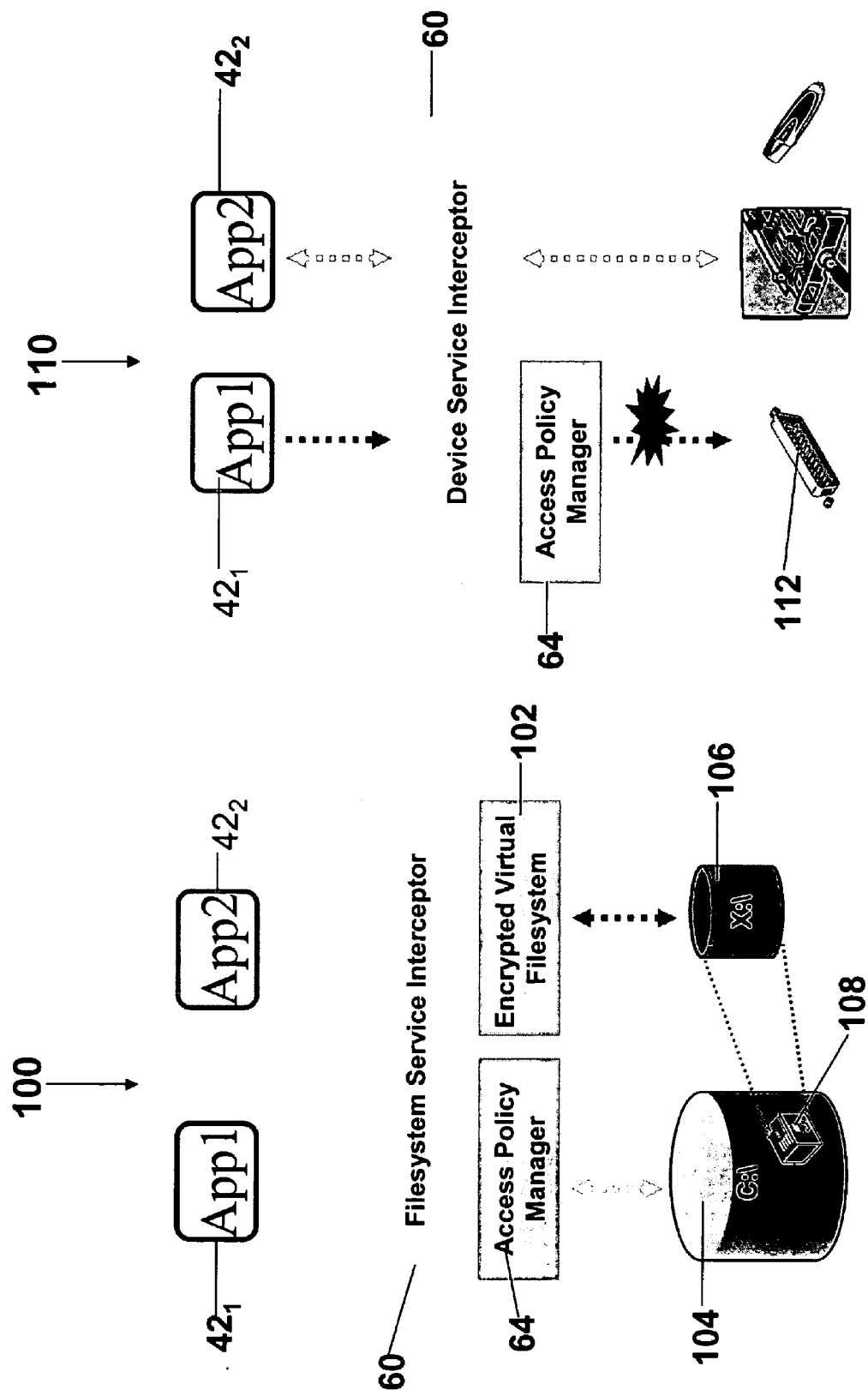

METHOD AND SYSTEM TO CREATE SECURE VIRTUAL PROJECT ROOM

PRIORITY CLAIM

This application claims priority under 35 USC 119(e) and 120 to U.S. Provisional Patent Application Ser. No. 60/663,584, filed on Mar. 21, 2005 and entitled "IP-protected Distributed Project Development Environment and Tools" the entirely of which is incorporated herein by reference.

FIELD OF THE INVENTION

This invention relates to a set of distributed project development tools to manage the files and tasks of the project with the focus on protecting the data and/or intellectual properties developed or licensed during the project life cycle. This invention is also related to the trusted operating environment field.

BACKGROUND OF THE INVENTION

There are many project development tools developed and commercialized in the past ten years. However, most of these tools' architecture is designed for development by teams located at the same location. Most of these tools do not provide any mechanism to protect the intellectual property (IP) assets created during the project. With the recent momentum for companies to use globally distributed teams and suppliers, the problems caused by a lack of a mechanism to protect the IP assets is exacerbated because other countries do not have the legal mechanisms to pursue people that have stolen the IP assets. Thus, it is desirable to provide a system that provides IP asset protection within a project development tool.

More recently, commercial tools became available where data collected from other development tools, called from the development process, are integrated to better estimate the productivity. These tools usually provide Web-based user interfaces for the convenience of sharing the views by the distributed teams. However, none of these tools has included the important capability of source code IP or data protection especially during the development time. The lack of focus on IP protection in the planning phase can create two problems when executing the plan:

The concern of losing source code IP will arise when dispatching tasks to remote teams, and the plan will then become one that does not leverage the true potential of the remote team.
  During execution time, there are few actions that a user can take to fully mitigate the risk of losing the source code IP and the available actions are mostly rigid and make the project development un-flexible and more costly.

Thus, it is desirable to provide a method and system for creating secure virtual project rooms that overcomes the limitations of the typical project development tools and it is to this end that the present invention is directed.

SUMMARY OF THE INVENTION

A method and system for creating secure virtual project rooms is provided. The system may have a set of distributed project development tools to manage the files and tasks of the development project with the focus on protecting the intellectual properties developed or licensed during the development of the project. The intellectual properties of the project may include the software code, business process in the form of software code, data that may reveal the trade secret of the business, or other forms of the data that is protectable. The system incorporates a trusted operating environment that relies on but does not replace a typical operating system.

The system creates an infrastructure to augment the planning tools and analytic tools, as well as provide a development environment for an IP-protected distributed project development. The system is able to discover IP-protection information, such as the vulnerability of the source files, create a vulnerability score based on the protection information and then allows users to have a flexible modeling method by adjusting the criteria for evaluating the vulnerability factor. The system may also provide a graphical user interface to review the result of the discovery that increases the visibility of the executed plans and a new plan, which is established based on the integrated information. Using the system, a manager can then manually adjust the recommended plan and the adjustment is communicated back to the system for continuously improving the plan. Based on the finalized plan, the specific IP-protection control schemes and configuration targeted for each team is created. Then, according to the control and configuration specifically given to the team, the team carries out their development independently at any location (including both remote and/or local locations.) During the execution of the project management, the access policy and control derived from the plan and the configuration is used to validate the configuration and control the identity, the tools, and the access of the IP files using the tools. The system also permits the monitoring and tracking to be turned on and off at various levels. The monitoring provided by the system may also be supplemented with event triggering for immediate notification of the IP access violation. The system may also generate tracking reports for policy adjustment and quality improvement measures.

Thus, in accordance with the invention, a method of securing a distributed project environment on a computing device is provided. In the method, a particular secure project is defined on the computing device wherein the particular secure project includes a plurality of pieces of content of the project where the content is secured so that only a user with a proper access privilege can access the content, one or more validated applications that are validated for use with the particular secure project and an access policy for a set of users. Using a validated application, a user can access the secured content that is a member of the access policy wherein the content is decrypted while being accessed by the validated application. When a piece of content is accessed by an application, the application is first validated as a validated application. During the period when the piece of secured content is decrypted, operations of the computing device that are capable of producing one of a complete copy and a partial copy of the piece of content are monitored. When an operation capable of producing one of a complete copy and a partial copy of the piece of content occurs, the method disallows the operation if the application is not a validated application or, if the copy operation is not disallowed, the piece of content is copied within the particular secure project so that the copied piece of content is stored in secured format.

BRIEF DESCRIPTION OF THE DRAWINGS

FIG. 8 illustrates an example of a file system security method using the secure project room system;

FIG. 9 illustrates an example of a device security method using the secure project room system;

DETAILED DESCRIPTION OF A PREFERRED EMBODIMENT

The invention is particularly applicable to a computing device based system wherein the secure project room application is a software application being executed by the computing device and it is in this context that the invention will be described. It will be appreciated, however, that the system and method in accordance with the invention has greater utility since the secure project room application can also be implemented in hardware or as a combination of hardware and software and the secure project system can be implemented on various different types of computing devices.

Broadly, the system provides a set of distributed project development tools to manage the files and tasks of the project with the focus on protecting the intellectual properties developed or licensed during the development of the project. For purposes of this description, the intellectual properties may include, but are not limited to the software code, business process in the form of software code, and data that may reveal the trade secret of the business, or other data that can be protected. The system also provides a trusted operating environment The system includes a set of tools that is compatible and interoperable with all of the existing tools and applications executable on the computing devices, and allows those tools/applications to be used in a system with a security focused plan. Thus, while customers can continue to use the tools, which they already purchased and familiar with, the system leverages the information obtained from them to address the protection by tightening the control of the distributed teams. The system also has additional controls that manage the communication and execution of the distributed project environment that they have never had before when using the existing tools. During execution time, the system first validates the identity of the user prior to the user using the requesting tools to access the requesting files. The system then controls the access of the files by just-in-time decrypting the files in as-needed basis. It also monitors and tracks the user activities with records for audits. The system also ensures the tool pass the "fingerprint" checking. This checking ensures the tool is not a Trojan horse, or is of the wrong version inadvertently. Now, an implementation of the secure project room system is described.

Figure 1:
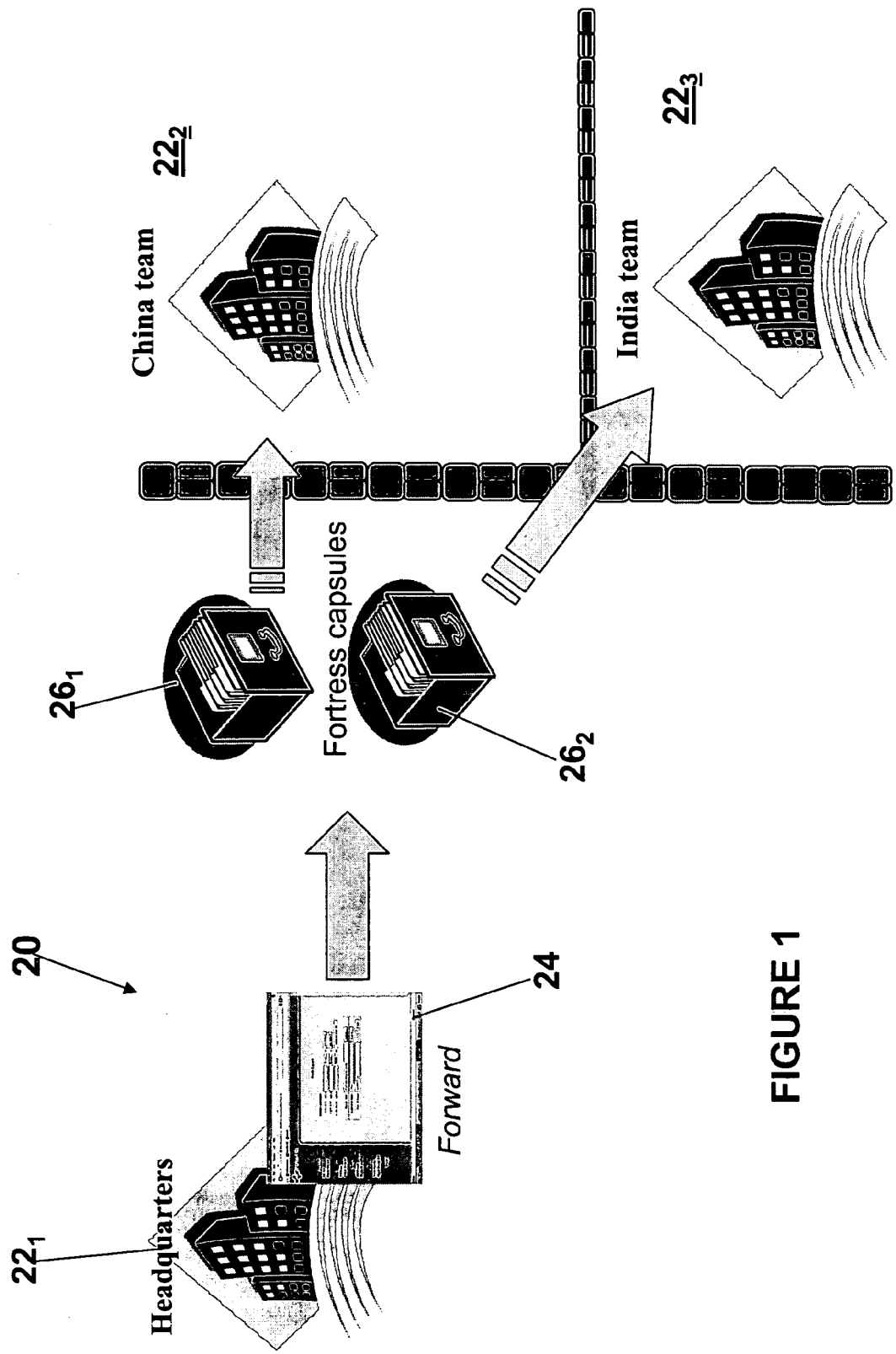
FIG. 1 illustrates an example of a secure project development environment using a secure project room system in accordance with the invention.

FIG. 1 illustrates an example of a secure project development environment 20 using a secure project room system in accordance with the invention. The system may be used to allow project/development teams in different locations to share confidential project and development information and data, such as source code, product specifications, etc. between the different locations. For example, project information may be shared between a headquarters $22_1$, a development team in remote location A $22_2$ and a development team in remote location B $22_3$ as shown in FIG. 1. To accomplish the secure sharing of the project information and data, an administrator with high privilege may use a Forward module 24. The Forward module (which is preferably a piece of software executed on a computing device at the highly privileged location) is a command center to rapidly create, administer, manage and replicate a "Fortress Capsule" which defines the scope of each project and the secure virtual project room for that project. In order to share project information with location A and location B, the Forward module 24 may generate two project capsules $26_1$ and $26_2$ that may then be delivered to the Location A and location B to provide the secure virtual project room for the project.

Figure 2:
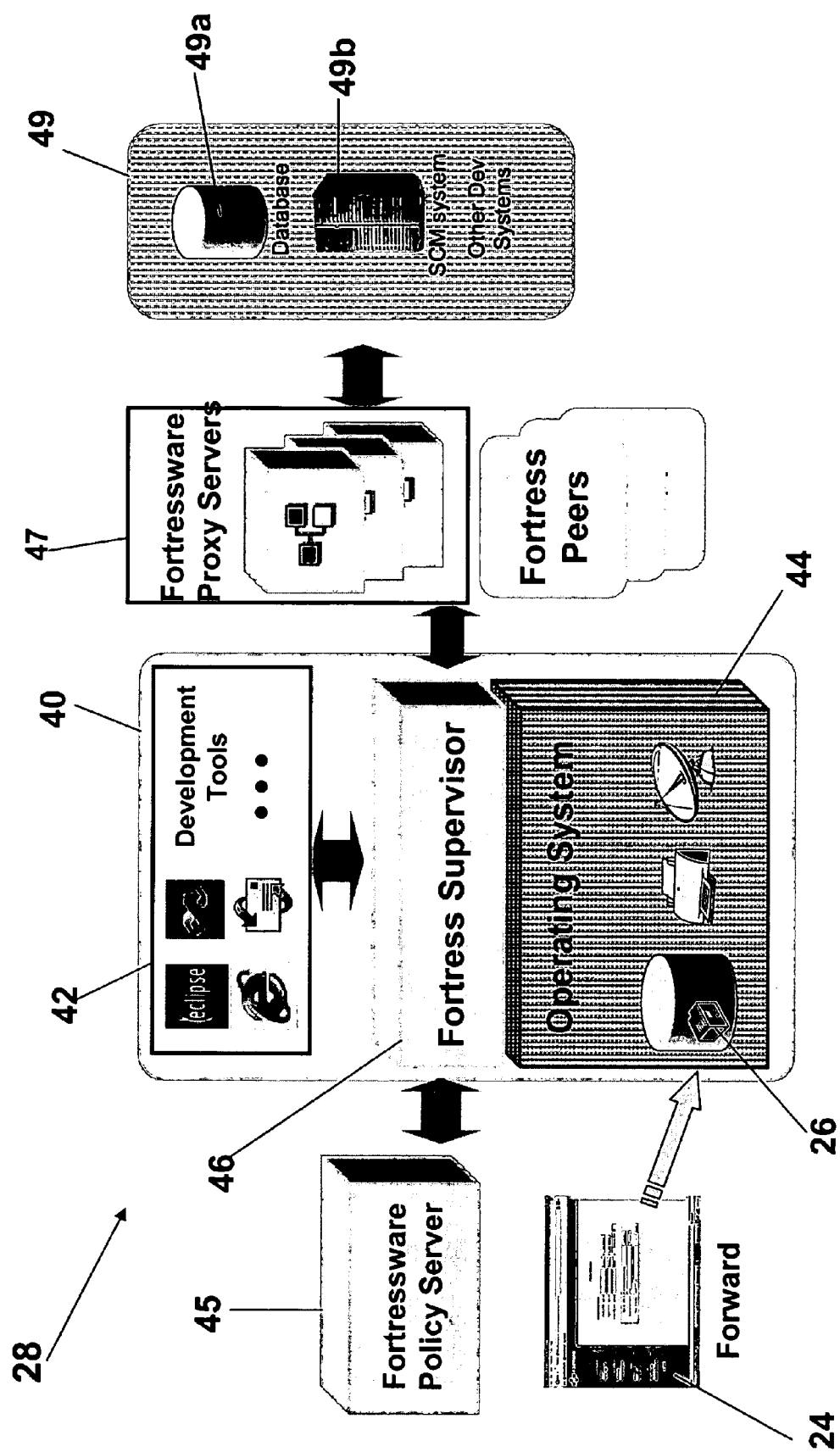
FIG. 2 illustrates an example of the architecture of a preferred implementation of the secure project room system.

FIG. 2 illustrates an example of the architecture of a preferred implementation of a secure project room system 28 that is implemented on a computing device 40 and other components. In this example, the computing device may be a typical personal computer that has network connectivity, sufficient processing power, sufficient storage and sufficient memory to operate a software-based version of a the secure project room. The elements of a personal computer with these attributes are well known and are not described further here. In accordance with the invention, the computing device 40 may also be any other processing unit based device that has sufficient processing power, memory, storage and network connectivity to implement the secure room system, such as for example, a mobile phone, a personal digital assistant, various forms of computer systems including laptops, desktops, tablet computer and the like, a set-top box or any other computing device with the characteristics set forth in which it would be desirable to provide a secure project room that permits the secure sharing of information during a project.

When the computing device 40 is being used to implement the secure virtual project room, the computing device 40 may store and execute one or more software applications or development tools 42, such as Adobe Acrobat, Microsoft Word or the like that the user of the computing device may use during the project and may execute an operating system (OS) 44 such as Windows XP. The computing device may also include a supervisor unit 46 that preferably is one or more pieces of software that are executed by the processing unit of the computing device to implement various functions and processes of the secure virtual project room as described in more detail below.

The computing device 40 may be coupled to (via any type of network or directly connected) a policy server 45 that controls the security and access to the capsules and the secure virtual project rooms and may interact with the Forward module that may forward the capsule 26 to the computing device so that the computing device can implement the secure virtual project room. The computing device may also be coupled to (over any type of network or directly connected) to one or more proxy servers 47. For server sites that desire to have project team sites connecting to them securely to perform tasks like checking in and checking out source files interactively in real time when developing software using the secure virtual project room, a project team site may interact through the proxy server. The proxy server serves as a "tunnel" between a network-connected destination server (e.g., a Perforce server running on a Solaris box in a preferred embodiment which is a preferred implementation of the destination server) and a client application on the computing device. In accordance with the invention, the proxy server operates like a network proxy server except that it maintains an encrypted connection to the remote client application within the secure virtual project room and maintains an unencrypted connection to one or more destination servers 49. In the example shown in FIG. 2, the destination servers may include one or more database servers 49*a* that may contain data to be used by the project and a source code management system 49*b* that can be used to control the source code for the project as well as other development systems.

Figure 3:
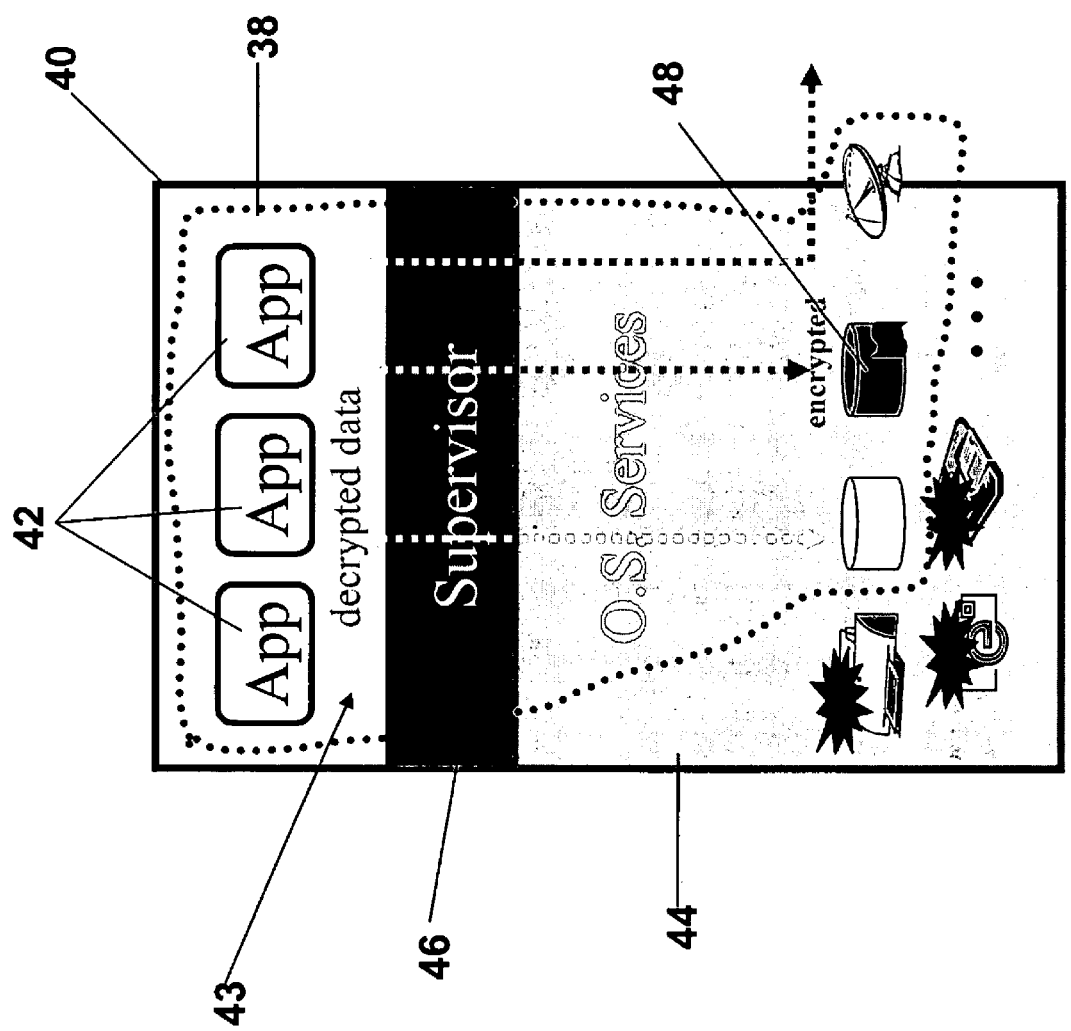
FIG. 3 illustrates an example of an implementation of a secure project room on a computing device.

FIG. 3 illustrates an example of an implementation of a secure project room 38 on the computing device 40. The secure project room 38 is implemented by the supervisor unit 46, that may be implemented as privileged code on the computing device 40 that implements the secure virtual project room. As shown in FIG. 3, the applications 42 operate with decrypted data. However, any project data leaving the application is again encrypted. The applications inside the secure room may include the various existing project management and project tools used by a user. Simultaneously, those applications and tools can operate outside of the secure room with un-encrypted data in conjunction with the secure project room 38 of the invention. When a secure project 48 (shown as the capsule 26 in FIG. 1) is opened by the user of the computing device, the secure project room 38 is automatically activated (shown by the dotted line in FIG. 3) wherein the data exchanged is encrypted until the moment when the application is to use the data to maintain the security of the information about the project. The secure project room 38 also maintains the security of the communication of data between the secure project room and anything outside of the secure project room.

Figure 4:
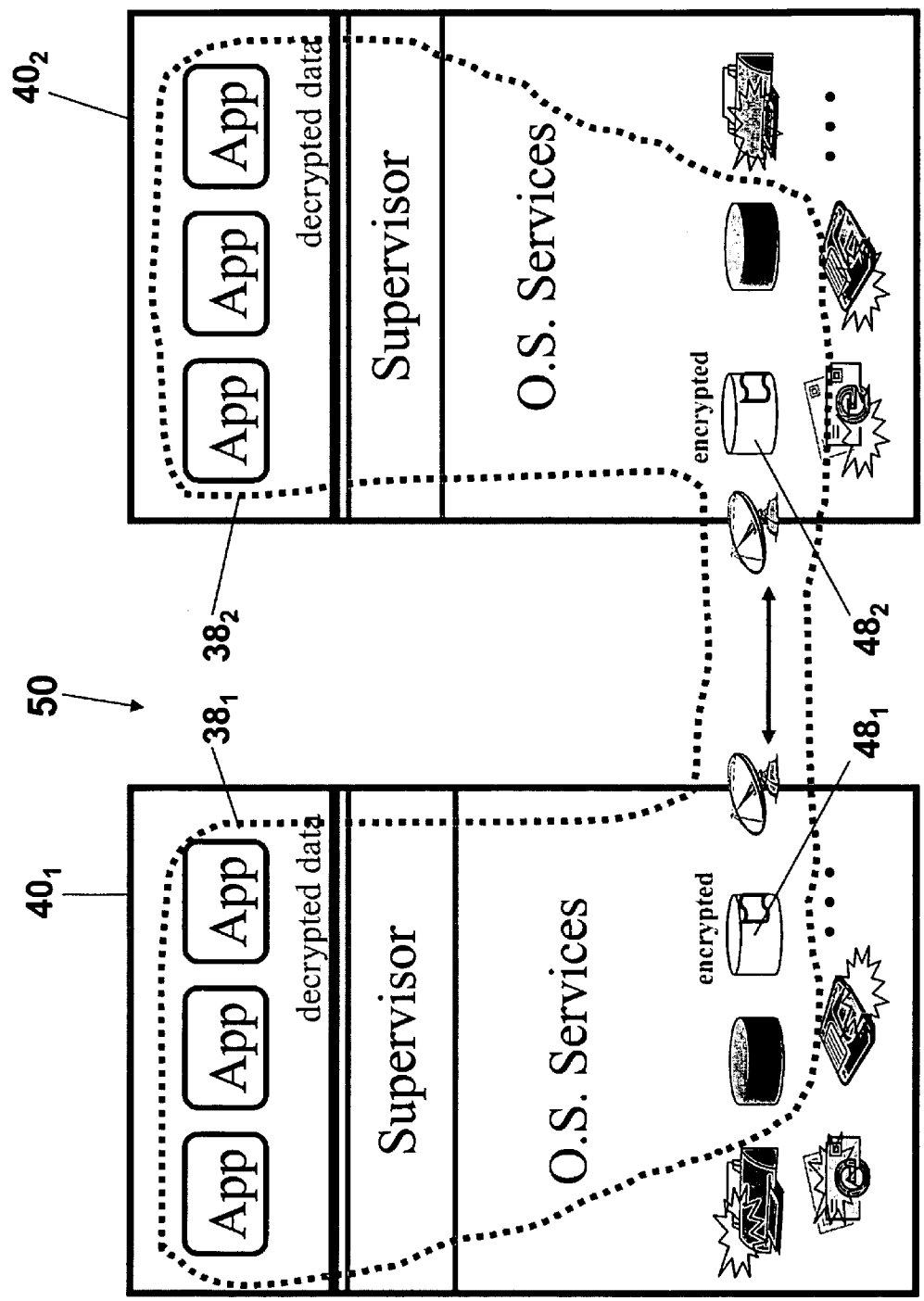
FIG. 4 illustrates an example of a secure project room system with at least two computing devices.

FIG. 4 illustrates an example of a secure project room system 50 with at least two computing devices 40$_1$, 40$_2$ wherein each computing device is executing its secure project room 38$_1$ and 38$_2$ to form a secure project room system in which the computing devices are able to securely exchange data (encrypted data) between the secure project rooms 38$_1$ and 38$_2$ operating on each computing device. In the example shown in FIG. 4, each user has launched a secure project 48$_1$ and 48$_2$ to form a secure project team community is which the IP of the project is protected while permitting each user to user the project tools and applications known to the user in conjunction with the secure project room system. The two projects are the same project except for the locations and the devices that they are on.

Figure 5:
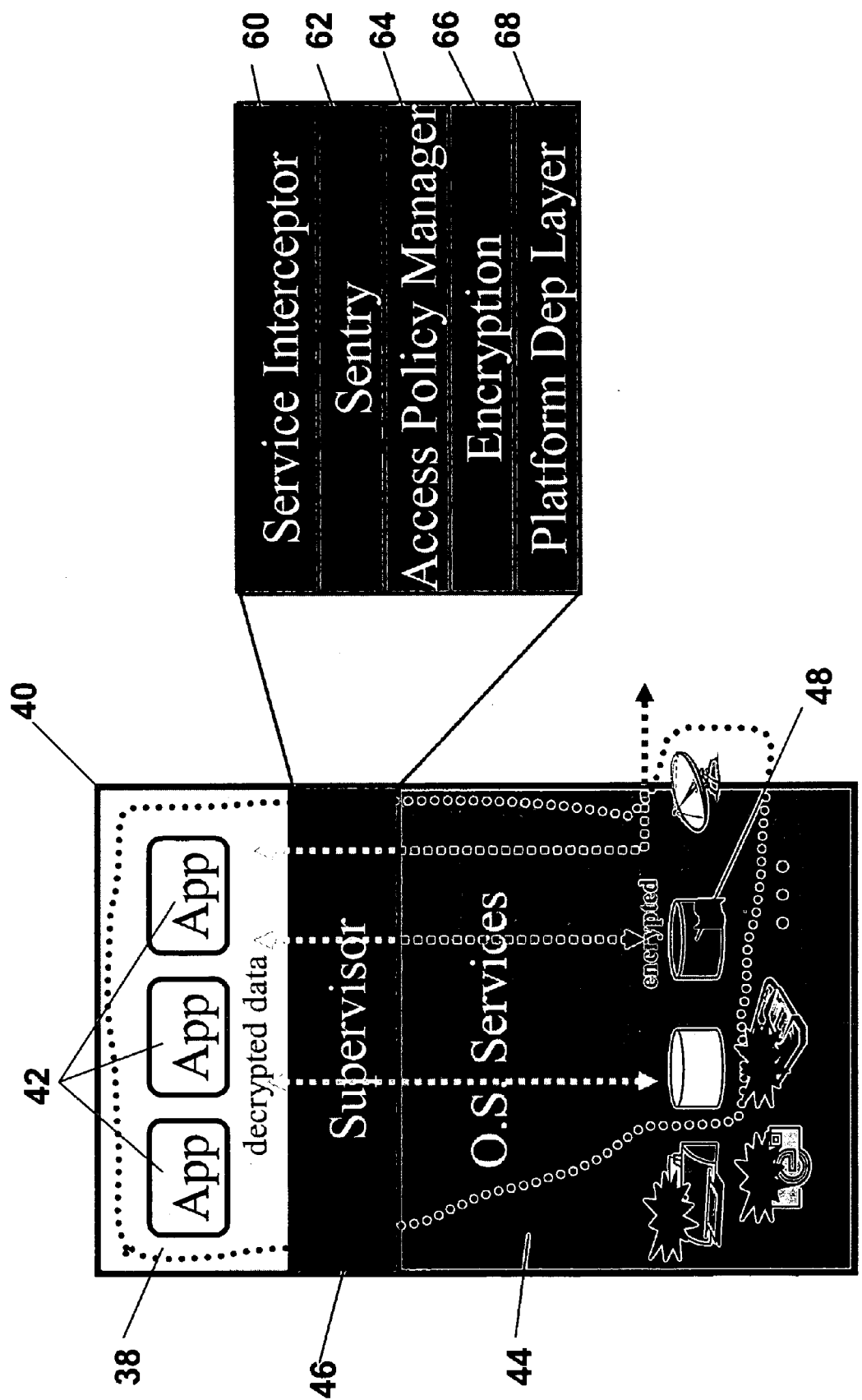
FIG. 5 illustrates further details of a secure project room application residing on a computing device.

FIG. 5 illustrates further details of a secure project room application 38 residing on a computing device and in particular the supervisor application 46. The supervisor application 46 may further comprise one or more modules that may preferably each be a piece of software that performs a certain function as described below. The supervisor, in the preferred embodiment, further comprises a service interceptor module 60, a sentry module 62, access policy manager module 64, an encryption module 66 and a platform development layer 68. In general, the supervisor intercepts the data and communications between the applications 42 and the operating system services 44 to ensure the security of the data and those communications within the secure virtual project room. The interceptor module 60 (also known as an operating system wrapper may intercept data and communications between the applications and the operating system 44. In more detail, the operating system (OS) wrapper intercepts the execution flow of a program executable, without the need to change, recompile, relink the program itself or the underlying OS, and then to validate the caller, and enforce the access policy set by the policy server of the secure virtual project room system. The interceptor module 60 is a thin layer between the core OS services and the applications that intercepts the applications' service requests (e.g., file I/O, network access, copy and paste request, etc.) and the delegates to the access policy manager module 64 for access control and secure auditing. Further details of the interceptor module 60 are shown below with reference to FIGS. 7-10 that show security method implemented by the interceptor module. The sentry module 62, during the execution of the project management system, monitors and maintains the access policy and control derived for the particular project and the configuration is used to validate the configuration and control the identity, the tools, and the access of the IP files using the tools.

The access policy manager module 64 may include a right management runtime that can be laid over a virtual machine, such as java virtual machine, to ensure the execution is secure even within the virtual machine. The access policy manager module 64 provides rule-based access control as well as based on the ability to identify a contaminated applications and take action on a contaminated application. A contaminated application is an application that has had contact with any secured data. Once an application is contaminated, the application data cannot leave the secured virtual project room to maintain the security of that data. The access policy manager module 64 also grants or denies access to secure data by an application based on the access policy and the contamination state of the application. The access policy manager module 64 may also generate a secured audit trail that records a user's access history and violations. One of the functions of the access policy manager module is to develop a fingerprint that uniquely identifies a tool executable. In the system, a fingerprint is created during planning time for each tool needed during development time, and used to validate the tool invoked during development time is the exact tool allowed at planning time.

The encryption module 66 ensures that the data and communications are encrypted. In more detail, the system encrypts files for general protection, and after validation, carries out just-in-time and as needed basis decryption. The encryption key and the distribution method are securely managed to ensure the files are securely contained in the repository until the right user who uses the right tool to access the content of the right file makes the request. The encryption is per project so that each project is secured by a unique encryption key. The encryption key for each project is automatically generated when new secure virtual project room is generated. The encryption module may also create an encrypted virtual file system (described below with reference to FIG. 8) that securely mounts a virtual disk after user login validation, encrypts all files inside of the virtual drive and performs just-in-time decryption when access policy are granted. The platform development layer 68, in some instances of the supervisor 46 delivered to certain users, permits the user to perform some development work.

Figure 6:
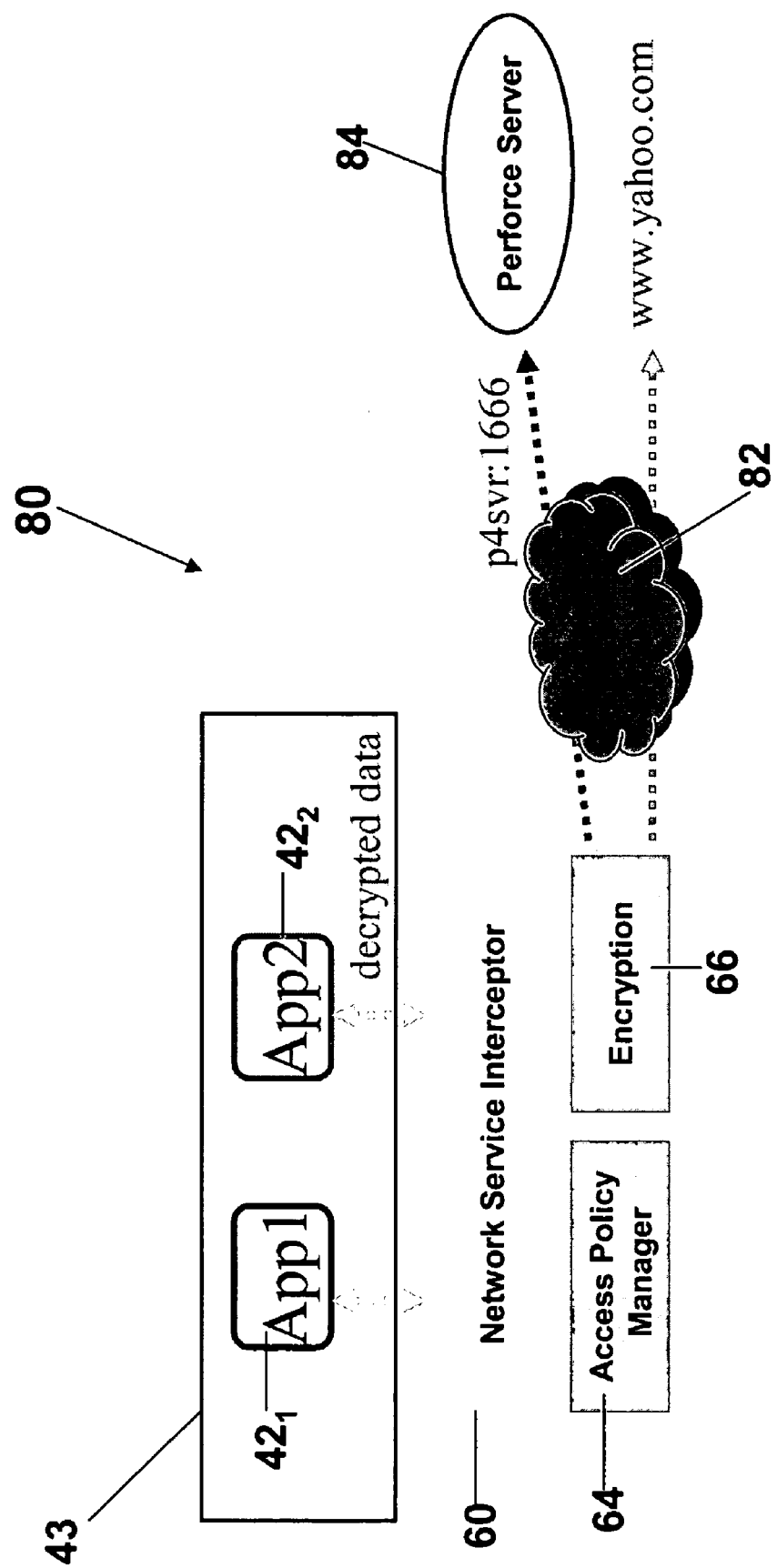
FIG. 6 illustrates an example of a network security method using the secure project room system.

FIG. 6 illustrates an example of a network security method 80 using the secure project room system that has the applications 42$_1$, 42$_2$ accessing decrypted data inside 43 of the secure virtual project room that includes a network interceptor portion of the interceptor module 60, the access policy manager 64 and the encryption module 66. To provide secure communications over a network 82, each secure virtual project has defined "secured connections" contained in the access policy for the project. In the example shown in FIG. 7, the connection "p4svr: 1666" is a secure connection to a perforce server 84. During the secure virtual project room operation, the interceptor 60 monitors all network traffic and performs just-in-time encryption/decryption (using the encryption module 66) before sending/receiving from the secured connections.

Once an application reads data/information from a secured connection, the application has been contaminated and, once contaminated, the application cannot send the secured data to an un-secured connection (such as www.yahoo.com) as shown in FIG. 6 because that connection is blocked for the contaminated application. However, an uncontaminated application can still access the un-secured connections while the secure virtual project room is operating.

Figure 7:
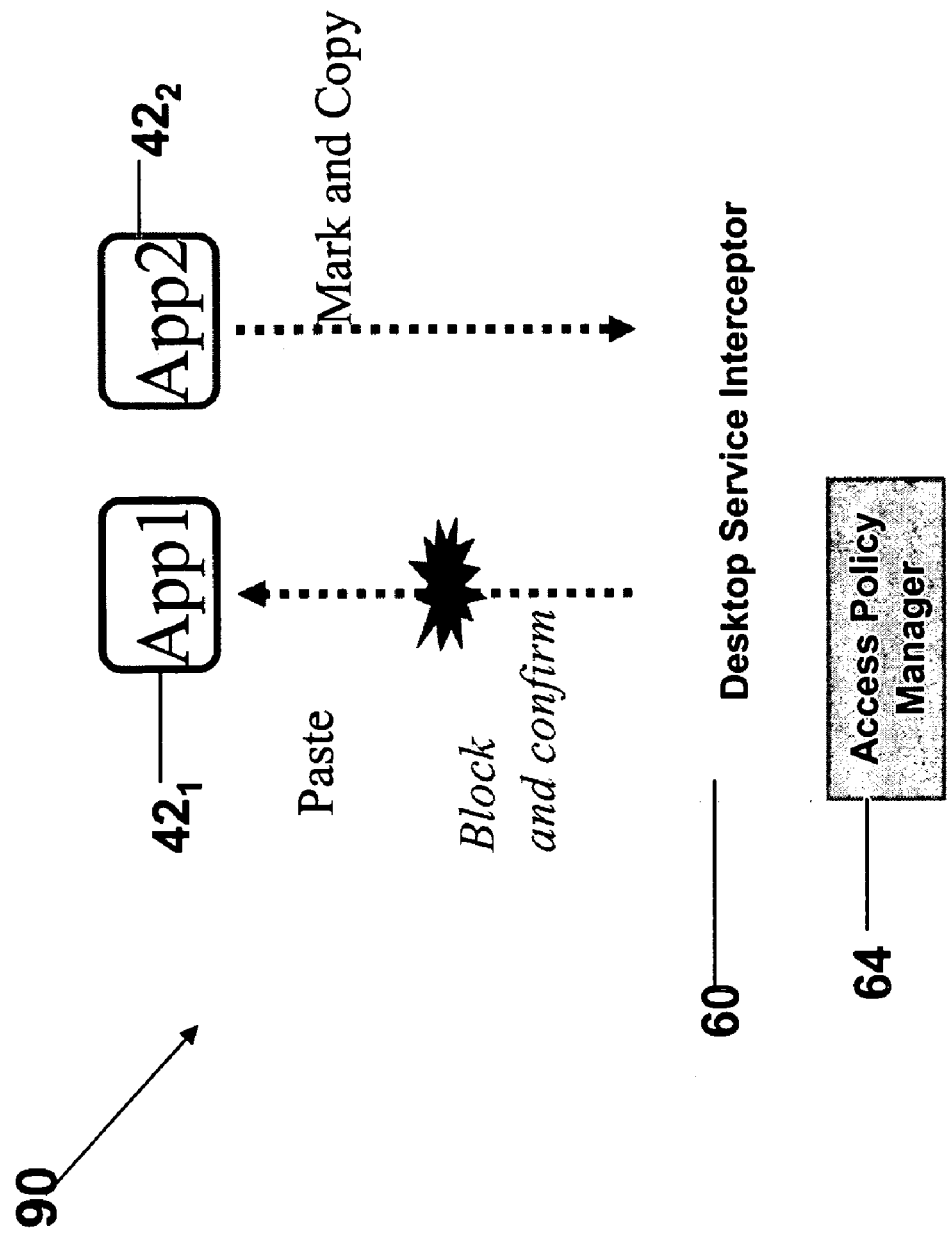
FIG. 7 illustrates an example of a desktop security method using the secure project room system.

FIG. 7 illustrates an example of a desktop security method 90 using the secure project room system that includes the applications $42_1$, $42_2$, a desktop service interceptor portion of the interceptor module 60 and the access policy manager module 64. To maintain desktop security, the desktop service interceptor intercepts service requests of the application, such as any copy and paste requests as shown in FIG. 7. In this example, the application $42_2$ marks and copies some data and the access policy manager module 64 records the copied source of the clipboard data. Then, if a non-contaminated application (application $42_1$) requests a paste from the contaminated source (application $42_2$), a confirmation alter is displayed confirming the paste request since the non-contaminated application (application $42_1$) will become contaminated if the data is pasted from the contaminated source. This methodology maintains the security of the secure data on the desktop even when the data is being shared between two applications on the computing device.

FIG. 8 illustrates an example of a file system security method 100 using the secure project room system that has the applications $42_1$, $42_2$, a file system portion of the interceptor module 60 and the access policy manager module 64. To provide file system security, the supervisor unit may also include an encrypted virtual file system 102 that is part of the encryption module described above. Once a project 108 is opened successfully (from a storage device 104), an encrypted virtual drive, X:\ 106, is mounted with a per project encryption key. During the project, the file system Service Interceptor monitors all file I/O access. Once an Application reads a secured file on the virtual drive X:\, the application is considered "contaminated". Once contaminated, the Application cannot write the secure data outside of X:\ (or send data to unsecured connection). However, a non-contaminated application can still freely access data outside of X:\.

FIG. 9 illustrates an example of a device security method 110 using the secure project room system that has the applications $42_1$, $42_2$, a device service interceptor that is part of the interceptor 60 and the access policy manager 64. The method controls the access of a device 112 to the secure virtual project room. To accomplish this, the device service interceptor intercepts all device access requests. As above, a contaminated application cannot output any data to any device whereas a non-contaminated application can freely access any device. As with all of the security methods described above, the method controls the security of secure data, but freely permits applications without any secure data access to operate on the computing device in the typical manner so that the secure virtual project system is invisible to the user of the computing device in most circumstances and works in harmony with any other applications executed by the computing device.

Figure 10:
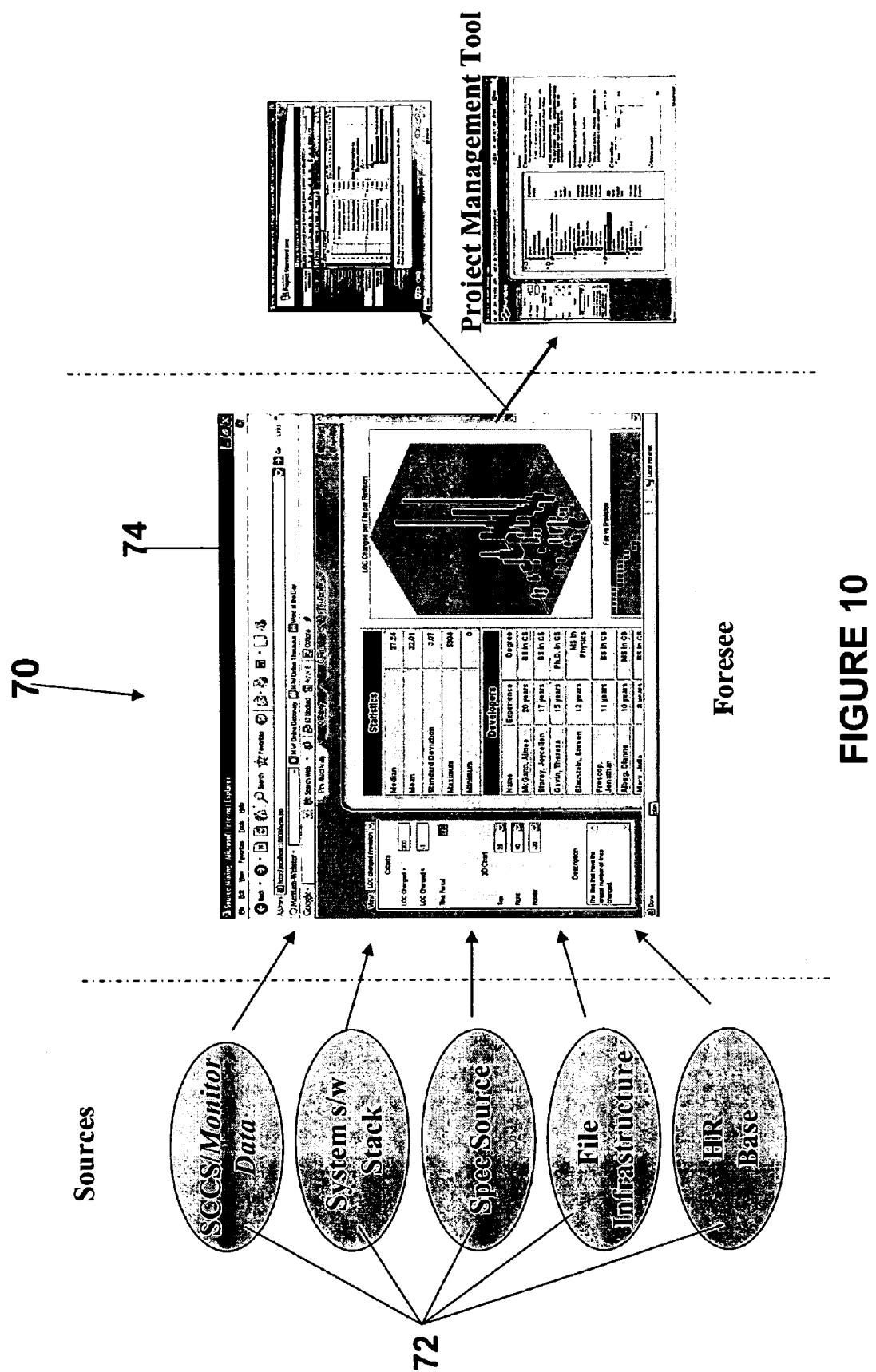
FIG. 10 illustrates an example of a project vulnerability tool for security focused planning that is part of the secure project room system.

The supervisor in combination with the capsule 26 (shown in FIG. 1) provides a secure virtual project room. The secure virtual project room has a monitoring and logging capability for all operations happening inside the room. When the logs are accumulated, they are sent to the privilege site for access violation analysis and for future project planning. As an additional tool to complement the secure project room, there is a Foresee module as indicated in FIG. 10. To ease the adaptability of examining the project plan for the specific project, Foresee provides a user interface wherein the user interface is customizable and configurable since each project is different and the user interface is customized so project managers can view the project in their own way. The user interface also presents the data using three dimensional graphics and the data can be the aggregate of the information collected from many of the existing tools. To view the 3-D graphics, users can easily zoom and drill-down from the visual display for details as needed. In addition, after the data is aggregated from the various tools, the combined data will be used to give a retrospective view of the project development as well as a prospective view of an improved project plan. The system may also include processes to extrapolate the collected data and then form a new projection. The system may also provide rules based modeling wherein the goal of the data mining is to provide a business operation model for managers to follow when planning their next distributed project development without having to worry about loss of IP. The modeling may provide an initial model to users as well as allow users to adjust the model to leverage the past productivity data, quality data, and the current understanding of the teams.

Inside the Foresee, there is a vulnerability analysis tool which can help managers decide the content of the secure project room in optimizing both the security and productivity. The project vulnerability tool (which may preferably be one or more pieces of software executing on the computing device) may draw information from one or more data sources 72 such as source code control system and monitor data, a system software stack, a specification source, a file infrastructure and a human resources base. Using the data from these data sources, the tool 70 may generate a user interface 74 that permits the user of the system, based on the vulnerability analysis, to re-plan the project. The changes to the project due to the re-planning may then be distributed out to the project management tools as shown. In addition, depending on the vulnerability score, the tool generates a list of "bill of goods" to create the content and access policy of the secure project room. For each project, there are various vulnerability measures which are totally project dependent. The vulnerability score is based on the input from the manager who is to describe the parameters that affect why certain modules are more vulnerable than others. The score is calculated based on these parameters and is therefore useful in deciding what content and access rights should be associated with the secure project room. And in this way, Foresee can be used as a pre-processor for Forward in order to go through a proper and complete planning process.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A method of securing a distributed project environment on a client side computing device in a secure project room system, the method comprising:

defining a particular secure project on the computing device, the particular secure project including a plurality of pieces of content of the project where the content is secured so that only a user with a proper access privilege can access the content, one or more validated applications that are validated for use with the particular secure project wherein the one or more validated applications are configured for the particular secure project to be able to access and copy the secure content and an access policy for a set of users;

accessing, using one of the validated applications, the secured content by a user that is a member of the access policy wherein the content is decrypted while being accessed by the validated application;

verifying, using an access policy manager of the secure project room system, when a piece of content is accessed by an application, that the application is a validated application;

monitoring, during the period when the piece of content is decrypted, using the access policy manager of the secure project room system, the operations of the computing device that are capable of producing one of a complete copy and a partial copy of the piece of content;

disallowing, when a copy operation of the content by the application on the client side device is detected by the access policy manager of the secure project room system, the copy operation if the application is not a validated application;

disallowing by the access policy manager of the secure project room system, when the application on the client side is trying to copy the piece of content to a location that is not within the particular secure project room, the copying of the piece of content by the application; and copying, on the client side computing device, if the copy operation is allowed the piece of content within the particular secure project so that the copied piece of content is stored in secured format.

2. The method of claim 1 further comprising creating a security layer on the computing device, the accessing, verifying, monitoring, determining and copying steps being performed by the security layer wherein the security layer has a local copy of the access policy so that the access policy is validated during the operation of the particular secure project.

3. The method of claim 2 further comprising communicating, with a remote access policy computing device, to receive the access policy.

4. The method of claim 3, wherein the access policy further comprises a set of rules that define a set of access policy using one or more factors wherein the one or more factors further comprises one or more of an identity of the user, an identity of the application, a previous access history of a running application instance, a time, a place where the access takes place, and a path of accessing the piece of content.

5. The method of claim 4 further comprising automatically propagating the access policy to one of a new piece of content and a contaminated application not currently controlled by the access policy so that the new piece of content and the contaminated application are controlled by the access policy wherein the new piece of content incorporates a secure piece of content and wherein the contaminated application has already accessed a secure piece of content.

6. The method of claim 3, wherein defining the particular secure project further comprises packaging the pieces of content and the local copy of the access policy into a secure package and storing the secure package at the remote access policy computing device.

7. The method of claim 6 further comprising transferring the secure package from the remote access policy computing device to the computing device to operate the particular secure project, the secure package having an expiration date after which the particular secure project cannot be accessed.

8. The method of claim 7 further comprising renewing, at the remote access policy computing device, the secure package to establish a new expiration date and access policy and communicating the updates to the computing device when it connects to the remote access policy computing device.

9. The method of claim 1, wherein securing the project, content and package further comprising encrypting the project, content and package using an encryption key.

10. The method of claim 9, wherein encrypting the project, content and package using an encryption key further comprises storing a generated encryption key at the remote access policy computing device and embedding the encryption key into a secure package.

11. The method of claim 9, wherein encrypting the project, content and package using an encryption key further comprising generating a unique encryption key for each secure project so that the secure environment is separated by project.

12. The method of claim 11 further comprising communication over a pre- defined set secure channels due to the unique encryption key for the users of a particular secure project wherein the secure channels further comprises one of a network channel and an email channel.

13. An apparatus for securing a distributed project environment on a client side computing device in a secure project room system, the apparatus comprising:

one or more applications executed by a processing unit of the client side computing device that perform operations on a secure project in the distributed project environment;

an operating system executed by the processing unit of the client side computing device;

a supervisor unit in the client side computing device being executed by the processing unit of the client side computing device, the supervisor unit in between the one or more applications and the operating system to maintain the security of the secure project, the secure project including a plurality of pieces of content of the secure project where the content is secured so that only a user with a proper access privilege can access the content, one or more validated applications that are validated for use with the secure project to access and copy the secure content and an access policy for a set of users associated with the secure project that defines access privileges of each user;

the supervisor unit further comprising means for accessing, using one of the validated applications, the secured content by a user in access policy wherein the content is decrypted while being accessed by the validated application, means for verifying, when a piece of content is accessed by an application, that the application is a validated application, means for monitoring, during the period when the piece of content is decrypted, operations of the computing device that are capable of producing one of a complete copy and a partial copy of the piece of content, means for disallowing, when a copy operation of the content by the application on the client side device is detected, the copy operation if the application is not a validated application, means for disallowing, when the application on the client side is trying to copy the piece of content to a location that is not within the particular secure project room, the copying of the piece of content by the application and means for copying if the copy operation is allowed, the piece of content within the particular secure project so that the copied piece of content is stored in secured format.

14. The apparatus of claim 13 further comprising a supervisor unit on the computing device, the supervisor unit having a local copy of the access policy for the secure project, the supervisor unit including the accessing means, the verifying means, the monitoring means, the determining means and the copying means.

15. The apparatus of claim 14 further comprising a remote access policy computing device and wherein the supervisor unit further comprises means for communicating, with the remote access policy computing device, to receive the access policy.

16. The apparatus of claim 15, wherein the remote access policy computing device further comprises a database management system that stores one or more access policies for one or more secure projects and a web user interface that permits a user to manage the remote access policy computing device.

17. The apparatus of claim 16, wherein each access policy further comprises one or more rules that determine a set of access policy of a particular user using a set of factors, the set of factors further comprising an identity of each user, an identity of an application, a previous access history of the running application instance, a time, a place where the access takes place, and a path of accessing the piece of content.

18. The apparatus of claim 17, wherein the monitoring means further comprises means for automatically propagating the access policy to one of a new piece of content and a contaminated application not currently controlled by the access policy so that the new piece of content and the contaminated application are controlled by the access policy wherein the new piece of content incorporates a secure piece of content and wherein the contaminated application has already accessed a secure piece of content.

19. The apparatus of claim 15, wherein the remote access policy computing device further comprising means for packaging the pieces of content and a local access policy for a secure project into a secure package wherein the secure package has an expiration date and means for transferring the secure package to the supervisor unit wherein the secure package cannot be accessed after the expiration date.

20. The apparatus of claim 19, wherein the remote access policy computing device further comprising means for renewing the expiration date and local access policy of a particular secure package and means for transferring the renewed expiration date and local access policy of the particular secure package when the supervisor unit connects to the remote access policy computing device.

21. The apparatus of claim 19, wherein the packaging means further comprises means for encrypting the secure package using an encryption key wherein the encryption key is embedded in the secure package and stored at the remote access policy computing device.

22. The apparatus of claim 21, wherein the encryption means further comprises means for generating a unique encryption key for each secure package containing a particular secure project so that each secure project is separately secured.

23. The apparatus of claim 22 further comprising two or more computing devices whose users are each a member of a secure project with a unique encryption key and a set of secure channels between the two or more computing device using the unique encryption key, wherein the secure channels further comprises one of a network channel and an email channel.

* * * * *